United States Patent
Calistri-Yeh et al.

(10) Patent No.: US 7,912,868 B2
(45) Date of Patent: *Mar. 22, 2011

(54) ADVERTISEMENT PLACEMENT METHOD AND SYSTEM USING SEMANTIC ANALYSIS

(75) Inventors: Randall Jay Calistri-Yeh, Florham Park, NJ (US); Wen Ruan, Manlius, NY (US); Clinton P. Mah, Fairfax, VA (US); Mary Louise Howatt, Toronto (CA); Mary E. McKenna, Natick, MA (US); Maurice J. Forrester, Syracuse, NY (US); Bo Yuan, Webster, NY (US); George B. Osborne, III, Macedon, NY (US); David L. Snyder, Pittsford, NY (US)

(73) Assignee: Textwise LLC, Syracuse, NY (US)

( * ) Notice: Subject to any disclaimer, the term of this patent is extended or adjusted under 35 U.S.C. 154(b) by 867 days.

This patent is subject to a terminal disclaimer.

(21) Appl. No.: 11/126,184

(22) Filed: May 11, 2005

(65) Prior Publication Data

US 2005/0216516 A1    Sep. 29, 2005

Related U.S. Application Data

(60) Continuation-in-part of application No. 10/823,561, filed on Apr. 14, 2004, now Pat. No. 7,299,247, which is a division of application No. 09/562,916, filed on May 2, 2000, now Pat. No. 6,751,621.

(60) Provisional application No. 60/569,613, filed on May 11, 2004, provisional application No. 60/569,612, filed on May 11, 2004.

(51) Int. Cl.
*G06F 17/30* (2006.01)
*G06F 17/27* (2006.01)

(52) U.S. Cl. .......................................... 707/803; 704/9

(58) Field of Classification Search .................. 707/104, 707/104.1
See application file for complete search history.

(56) References Cited

U.S. PATENT DOCUMENTS

| | | | |
|---|---|---|---|
| 4,839,853 A | 6/1989 | Deerwester et al. |
| 5,301,109 A | 4/1994 | Landauer et al. |
| 5,379,366 A | 1/1995 | Noyes |
| 5,404,506 A | 4/1995 | Fujisawa et al. |

(Continued)

OTHER PUBLICATIONS

Bartell-B-T and Cottrell-G-W and Belew-R-K. "Representing Documents Using an Explicit Model of their Similarities" J of the American Society for Information. May 1995.

(Continued)

*Primary Examiner* — Neveen Abel-Jalil
*Assistant Examiner* — Tarek Chbouki
(74) *Attorney, Agent, or Firm* — McDermott Will & Emery LLP

(57) ABSTRACT

An advertisement placement method and system for relating an advertisement to a dataset based on a trainable semantic vector (TSV) associated with the dataset and respective semantic representations of the advertisements. The trainable semantic vector associated with the dataset is generated based on at least one data point included in the dataset and known relationships between predetermined data points and predetermined categories. A comparison process is performed to determine a similarity between the trainable semantic vector associated with the dataset and the semantic representation associated with each of the plurality of advertisements. The system selectively relates one or more of the advertisements with the dataset based on a result of the comparison process. The selected advertisement or advertisements may be displayed with the dataset.

22 Claims, 6 Drawing Sheets

U.S. PATENT DOCUMENTS

| | | | | |
|---|---|---|---|---|
| 5,619,709 | A | * | 4/1997 | Caid et al. ............... 715/532 |
| 5,625,767 | A | | 4/1997 | Bartell et al. |
| 5,715,468 | A | * | 2/1998 | Budzinski ................ 704/9 |
| 5,740,323 | A | | 4/1998 | Nomura et al. |
| 5,790,754 | A | | 8/1998 | Mozer et al. |
| 5,809,490 | A | | 9/1998 | Guiver et al. |
| 5,826,268 | A | | 10/1998 | Schaefer et al. |
| 5,828,999 | A | | 10/1998 | Bellegarda et al. |
| 5,873,056 | A | | 2/1999 | Liddy et al. |
| 5,924,105 | A | | 7/1999 | Punch et al. |
| 5,937,384 | A | | 8/1999 | Huang et al. |
| 5,963,940 | A | | 10/1999 | Liddy et al. |
| 5,974,412 | A | | 10/1999 | Hazlehurst et al. |
| 6,006,221 | A | | 12/1999 | Liddy et al. |
| 6,021,387 | A | | 2/2000 | Mozer et al. |
| 6,023,663 | A | * | 2/2000 | Kim ........................ 702/81 |
| 6,026,388 | A | | 2/2000 | Liddy et al. |
| 6,076,088 | A | | 6/2000 | Paik et al. |
| 6,134,532 | A | * | 10/2000 | Lazarus et al. ............ 705/14 |
| 6,138,116 | A | | 10/2000 | Kitagawa et al. |
| 6,175,828 | B1 | | 1/2001 | Kuromusha et al. |
| 6,189,002 | B1 | | 2/2001 | Roitblat |
| 6,192,360 | B1 | * | 2/2001 | Dumais et al. ............ 707/6 |
| 6,208,971 | B1 | | 3/2001 | Bellegarda et al. |
| 6,216,112 | B1 | | 4/2001 | Fuller et al. |
| 6,246,977 | B1 | * | 6/2001 | Messerly et al. .......... 704/9 |
| 6,263,335 | B1 | | 7/2001 | Paik et al. |
| 6,269,361 | B1 | | 7/2001 | Davis et al. |
| 6,269,368 | B1 | | 7/2001 | Diamond |
| 6,289,353 | B1 | * | 9/2001 | Hazlehurst et al. ........ 707/102 |
| 6,304,864 | B1 | | 10/2001 | Liddy et al. |
| 6,321,225 | B1 | * | 11/2001 | Heckerman et al. ........ 707/6 |
| 6,327,581 | B1 | * | 12/2001 | Platt ........................ 706/12 |
| 6,330,563 | B1 | * | 12/2001 | Heckerman et al. ........ 707/100 |
| 6,356,864 | B1 | | 3/2002 | Foltz et al. |
| 6,405,199 | B1 | | 6/2002 | Carter et al. |
| 6,418,434 | B1 | | 7/2002 | Johnson et al. |
| 6,430,559 | B1 | | 8/2002 | Zhai |
| 6,446,061 | B1 | * | 9/2002 | Doerre et al. ............ 1/1 |
| 6,513,027 | B1 | | 1/2003 | Powers et al. |
| 6,523,026 | B1 | | 2/2003 | Gillis |
| 6,542,878 | B1 | * | 4/2003 | Heckerman et al. ........ 706/20 |
| 6,725,227 | B1 | | 4/2004 | Li |
| 6,751,621 | B1 | | 6/2004 | Calistri-Yeh et al. |
| 6,766,287 | B1 | * | 7/2004 | Kupiec et al. ............. 704/9 |
| 6,816,857 | B1 | | 11/2004 | Weissman et al. |
| 6,847,966 | B1 | | 1/2005 | Sommer et al. |
| 7,299,247 | B2 | * | 11/2007 | Calistri-Yeh et al. ...... 707/104.1 |
| 7,444,384 | B2 | * | 10/2008 | Horvitz .................... 709/207 |
| 2002/0077916 | A1 | * | 6/2002 | Greene ..................... 705/26 |
| 2002/0107839 | A1 | * | 8/2002 | Heckerman ............... 707/3 |
| 2004/0059708 | A1 | | 3/2004 | Dean et al. |
| 2004/0193414 | A1 | * | 9/2004 | Calistri-Yeh et al. ...... 704/245 |
| 2004/0199546 | A1 | * | 10/2004 | Calistri-Yeh et al. ...... 707/104.1 |
| 2006/0106783 | A1 | | 5/2006 | Saffer et al. |

OTHER PUBLICATIONS

Bullinaria-J-A and Huckle-C-C. "Modeling Lexical Decision Using Corpus Derived Semantic Representations in a Connectionist Network" Proc of the 4th Neural Computation and Psychology Workshop. 1997.

Lewis-D-D. "Text Representation for Intelligent Text Retrieval: A Classification-Oriented View" 1992.

Liu-G-Z. "Semantic Vector Space Model: Implementation and Evaluation" J of the American Society for Information Science. May 1997.

Lui-G-Z. "The Semantic Vector Space Model (SVSM): A text Representation and Searching Technique" IEEE 1994.

Patel-M. "Extracting Semantic Representation from Large Text Corpora" Proc of the 4th Neural Computation and Psychology Workshop. 1997.

Stefan Wernter, Garen Arevian and Christo Panchev, "Recurrent Neural Network Learning for Text Routing", Artificial Neural Networks, Sep. 7-10, 1999, Conference Publication No. 470, pp. 898-903, Sunderland, UK.

Keinosuke Fukunaga et al., "A Criterion and an Algorithm for Grouping Data", IEEE Transactions on Computers, vol. C-19, No. 10, Oct. 1970, pp. 917-923.

B.D. Ripley, "Neural Networks and Related Methods for Classification", J. R. Statist. Soc. B (1994), 56, No. 3, pp. 409-456.

Chidanand Apte and Fred Damerau, "Automated Learning of Decision Rules for Text Categorization", *ACM Transactions on Information Systems*, vol. 12, No. 3, Jul. 1994, pp. 233-251.

Elizabeth D. Liddy, Woojin Paik, Edmund S. Yu, "Text Categorization for Multiple Users Based on Semantic Features from a Machine-Readable Dictionary", *ACM transactions on information systems*, vol. 12. No. 3, Jul. 1994, pp. 278-295.

Randy Calistri-Yeh, Bo Yuan, "The MAPIT Patent-TSV System", Version 2.7, Jan. 11, 2000, pp. 1-77.

* cited by examiner

|       | $CAT_1$ | $CAT_2$ | $CAT_3$ | $CAT_4$ | $CAT_5$ |
|-------|------|------|------|------|------|
| $u(W_1)$ | 0.00 | 0.74 | 0.00 | 0.00 | 0.10 |
| $u(W_2)$ | 0.09 | 0.15 | 0.20 | 0.36 | 0.03 |
| $u(W_3)$ | 0.73 | 0.00 | 0.48 | 0.04 | 0.00 |
| $u(W_4)$ | 0.00 | 0.07 | 0.08 | 0.48 | 0.11 |
| $u(W_5)$ | 0.18 | 0.04 | 0.25 | 0.12 | 0.11 |
|       |      |      |      |      |      |
| $v(W_1)$ | 0.00 | 0.71 | 0.00 | 0.00 | 0.29 |
| $v(W_2)$ | 0.04 | 0.17 | 0.33 | 0.38 | 0.08 |
| $v(W_3)$ | 0.29 | 0.00 | 0.68 | 0.04 | 0.00 |
| $v(W_4)$ | 0.00 | 0.08 | 0.12 | 0.46 | 0.35 |
| $v(W_5)$ | 0.08 | 0.04 | 0.40 | 0.12 | 0.36 |

Figure 5

|       | $CAT_1$ | $CAT_2$ | $CAT_3$ | $CAT_4$ | $CAT_5$ |
|-------|------|------|------|------|------|
| $TSV(W_1)$ | 0.00 | 0.72 | 0.00 | 0.00 | 0.24 |
| $TSV(W_2)$ | 0.05 | 0.16 | 0.30 | 0.37 | 0.07 |
| $TSV(W_3)$ | 0.40 | 0.00 | 0.63 | 0.04 | 0.00 |
| $TSV(W_4)$ | 0.00 | 0.08 | 0.11 | 0.47 | 0.29 |
| $TSV(W_5)$ | 0.11 | 0.04 | 0.36 | 0.12 | 0.30 |

Figure 6

ADVERTISEMENT PLACEMENT METHOD AND SYSTEM USING SEMANTIC ANALYSIS

RELATED APPLICATIONS

This application claims the benefits of priority from U.S. Provisional Patent Application No. 60/569,613, filed on May 11, 2004, entitled "ADVERTISEMENT PLACEMENT USING TRAINABLE SEMANTIC VECTORS," and from U.S. Provisional Patent Application No. 60/569,612, filed on May 11, 2004, entitled "ADVERTISEMENT PLACEMENT AUCTION SYSTEM BASED ON ADVERTISEMENT-DOCUMENT RELEVANCE MEASURE;" and is a continuation-in-part of U.S. patent application Ser. No. 10/823,561, filed on Apr. 14, 2004, now U.S. Pat. No. 7,299,247 and entitled CONSTRUCTION OF TRAINABLE SEMANTIC VECTORS AND CLUSTERING, which is a divisional of U.S. patent application Ser. No. 09/562,916, filed May 2, 2000 and now issued as U.S. Pat. No. 6,751,621, the disclosures of which are incorporated herein by reference.

FIELD OF DISCLOSURE

The present disclosure relates to methods and systems for selecting an advertisement based on a semantic analysis, more specifically, to associating one or more advertisements with a target object, such as a document, based on analyses of semantic representations of the advertisements and the target object.

BACKGROUND OF THE DISCLOSURE

An advertisement placement system is used to select and display advertisements that are contextually related to a specific dataset, such as one or more documents, e-mail messages, RSS feeds, or web pages, that is being viewed or manipulated by a user. One type of system, such as SmartAd by Vibrant Media and early versions of Quigo AdSonar, uses a keyword method to place contextually related advertisements on web pages. According to the keyword method, each advertisement is assigned a small number of keywords. When an advertisement request is received, the system compares the keywords associated with the web page with keywords on each advertisement, and determines whether an advertisement is appropriate based on whether all or some of its keywords match the web page keywords. This type of advertisement placement system has several disadvantages. First, the number of keywords retained from a document is typically restricted for reasons of runtime efficiency, leading to a poor representation of the document. If a manual selection of keywords is involved, the process is extremely labor-intensive. Furthermore, an advertisement may mistakenly match a non-relevant document if the advertisement and the document share a keyword that has different meanings in the contexts. Such an approach also will miss an advertisement that is contextually related to a document but does not have an exact match in the keywords.

Other types of advertisement placement systems, such as Kanoodle ContextTarget, use category methods to find advertisements related to a web page. In the category method, each advertisement is assigned to one or more categories. Each of a plurality of web pages is assigned to one or more categories. When an advertisement request is received for a web page, the system determines the corresponding category or categories of the web page and retrieves any or all advertisements in the same category or categories.

Category methods have several drawbacks. First, if a manual assignment of categories is involved, the process is prohibitively expensive and tedious. Further, even with automatic category assignments the category methods do not provide precise matches between web pages and advertisements because all advertisements and web pages within a category are typically considered equally good matches, limiting match relevance to a fairly coarse granularity. In addition, the category methods have difficulty handling advertisements or web pages that do not fall cleanly into a single category, either because the advertisement or web page spans multiple topics, or because the advertisement or web page is about a topic that does not have a clear correspondence in the category scheme.

A system called Quigo AdSonar Exchange tries to combine the keyword and category methods, in which it first assigns each web page and advertisement into one of several broad categories, and then performs keyword matching within that category. However, such an approach still shares some or all disadvantages of the keyword and category methods.

Accordingly, there is a need for a method and system to effectively determine contextual relevance between an advertisement and a dataset. In addition, there is a need for an advertisement placement method and system that effectively select one or more advertisements that are contextually relevant to a dataset.

SUMMARY OF THE DISCLOSURE

Various embodiments are disclosed relating to advertisement placement methods and systems that relate a first dataset to a second dataset based on the contextual relevance determined based on unique semantic representations called trainable semantic vectors. The datasets may include advertisements, documents, web pages, etc.

According to one embodiment, an exemplary advertisement placement system relates one of a plurality of advertisements to a dataset based on a trainable semantic vector (TSV) associated with the dataset and respective semantic representations of the advertisements. The dataset includes at least one data point. The trainable semantic vector associated with the dataset is generated based on the at least one data point included in the dataset and known relationships between predetermined data points and predetermined categories. The trainable semantic vectors associated with the dataset and semantic representations of the advertisements are accessed. A comparison process is performed to determine a similarity between the trainable semantic vector associated with the dataset and the semantic representation associated with each of the plurality of advertisements. The system selectively relates one or more of the advertisements with the dataset based on a result of the comparison process. The selected one or more advertisements may be displayed with the dataset. In one aspect, the system relates an advertisement to the dataset only when the similarity therebetween exceeds a predetermined threshold. In another aspect, the predetermined data points used to generate the TSVs can come from any single language or can include more than one language.

According to one embodiment, at least one of the advertisements includes at least one data point, and the semantic representation associated with each of the at least one of the advertisements is a trainable semantic vector generated based on the at least one data point and the known relationships between the predetermined data points and the predetermined categories.

According to another embodiment, the semantic representation associated with at least one of the advertisements is a pre-assigned vector having dimensions equal to the trainable semantic vector associated with the dataset, and is derived from pre-selected keywords or preferred categories selected from the predetermined categories. According to still another embodiment, the semantic representation associated with at least one of the plurality of advertisements is a trainable semantic vector generated further based on pre-selected keywords and known relationships between the predetermined data points and the predetermined categories. In one aspect, the trainable semantic vectors associated with the advertisements may be generated further based on at least one pre-assigned keyword that is not included in the advertisements.

The TSV of the dataset may be generated further based on other information that is not explicitly included in the dataset, such as a user profile or data points linked to the dataset. The user profile may include information related to datasets previously reviewed by the user, search requests initiated by the user, and information of user preference, personal information of the user, and the like.

In one embodiment, at least one of the trainable semantic vector of the dataset and the semantic representations of the advertisements is predetermined and included in the dataset or the advertisements. In another embodiment, the respective trainable semantic vectors of the dataset or advertisements are calculated dynamically when the system selects an advertisement to be associated with the dataset.

Another exemplary system according to this disclosure selectively relates a first dataset to a second dataset based on a similarity between the respective trainable semantic vectors of the first dataset and the second dataset. The trainable semantic vector of the first dataset or the trainable semantic vector of the second dataset is included in their respective datasets.

According to another embodiment, an exemplary system calculates TSVs for various sections of a dataset, such as a web page or displayed document, and automatically links to each section one or more descriptions from one or more background data sources, such as encyclopedic articles from Wikipedia (http://www.wikipedia.org), based on a similarity between the respective trainable semantic vectors of the sections and the background articles.

Yet another exemplary system according to this disclosure relates specific products, such as books, to dynamic user content, such as e-mail messages or RSS feeds, based on a similarity between the respective trainable semantic vectors of the respective product descriptions and user content.

The exemplary advertisement placement systems as described herein may be implemented using one or more computer systems and/or appropriate software.

Additional advantages and novel features of the present disclosure will be set forth in part in the description which follows, and in part will become apparent to those skilled in the art upon examination of the following, or may be learned by practice of the present disclosure. The embodiments shown and described provide an illustration of the best mode contemplated for carrying out the present disclosure. The disclosure is capable of modifications in various obvious respects, all without departing from the spirit and scope thereof. Accordingly, the drawings and description are to be regarded as illustrative in nature, and not as restrictive. The advantages of the present disclosure may be realized and attained by means of the instrumentalities and combinations particularly pointed out in the appended claims.

BRIEF DESCRIPTION OF THE DRAWINGS

The present disclosure is illustrated by way of example, and not by way of limitation, in the accompanying drawings, wherein elements having the same reference numeral designations represent like elements throughout and wherein:

FIG. 5 is a table illustrating values corresponding to the significance of the words from FIG. 4;

FIG. 6 is a table illustrating a representation of the words from FIG. 4 in a semantic space.

DETAILED DESCRIPTIONS OF ILLUSTRATIVE EMBODIMENTS

Figure 1:
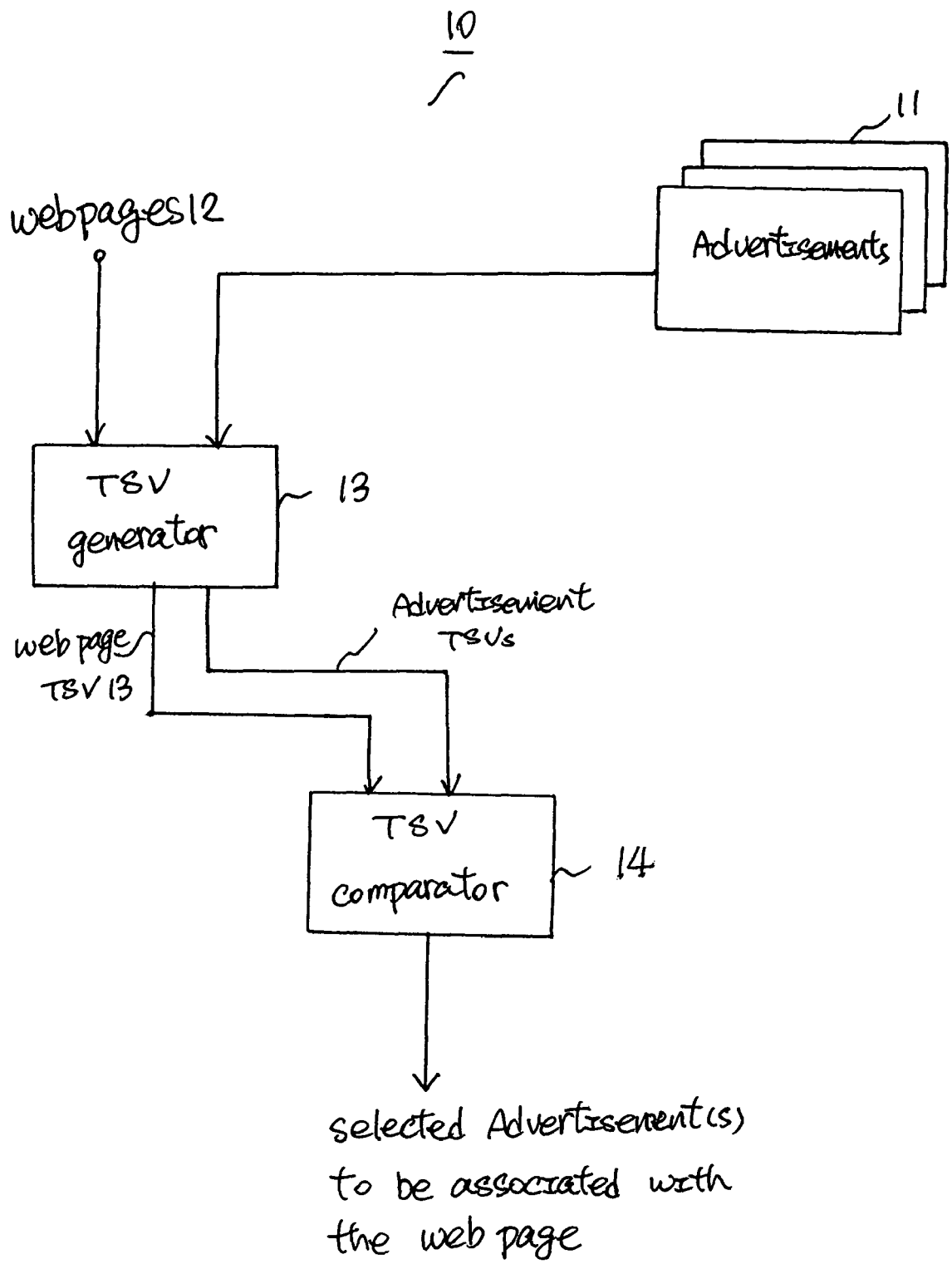
FIG. 1 is a diagram illustrating the operation of an exemplary advertisement placement system.

In the following description, for the purposes of explanation, numerous specific details are set forth in order to provide a thorough understanding of the present disclosure. It will be apparent, however, to one skilled in the art that concepts of the disclosure may be practiced or implemented without these specific details. In other instances, well-known structures and devices are shown in block diagram form in order to avoid unnecessarily obscuring the present disclosure.

Overview of the Exemplary Advertisement Placement System

For illustration purpose, the following examples describe operations of illustrative embodiments that retrieve one or more advertisements that are contextually related to a dataset, such as a web page being reviewed by a user or an opened document, based on similarities between a trainable semantic vector (TSV) associated with a dataset and respective semantic representations of the advertisements. A trainable semantic vector (TSV) is a unique type of semantic representation of a dataset, and is generated based on data points included in the dataset and known relationships between predetermined data points and predetermined categories. Details of constructions and characteristics of trainable semantic vectors will be described shortly.

The advertisements may consist of any combination of media, such as text, sound or animation. The selection of one or more advertisements for a particular dataset can occur ahead of time, at the time the dataset is presented, or at some later time. The semantic representations of the advertisements may be generated using various approaches and may have a variety of formats, as long as the formats or approaches allow determination of similarities between the TSV of the dataset and the respective semantic representations of the advertisements. According to one embodiment, the semantic representations of the advertisement also are trainable semantic vectors.

As used in the description herein, the term "dataset" refers to a collection of at least one item with associated information, and the term "data point" refers to a subset of the dataset. For instance, if a dataset is representative of a document, then a data point could be representative of words, phrases, and/or sentences contained in the document. A dataset can be a collection of a plurality of datasets, or a portion of a larger dataset. Examples of datasets include web pages, advertisements, search result pages, e-mails, documents, RSS feeds, multimedia files, photos, figures, drawings, electronic computer documents, sound recordings, broadcasts, video files, etc., or a collection of one or more of the above. Examples of data points include words, phrases, symbols, terms, hyperlinks, metadata information, keywords, and/or any displayed or un-displayed item(s) included in the dataset. It should be noted, however, that the data point can also be representative of any type of information that can be related back to the original dataset. In the case of documents, for example, a data point can be representative of information such as bibliographic information (e.g. author), full words, sentences, typography, punctuation, pictures, or arbitrary character strings. In the context of this disclosure, "web pages" are understood to refer to any compilation or collection of information that can be displayed in a web browser such as Microsoft Internet Explorer, the content of which may include, but does not limit to, HTML pages, JavaScript pages, XML pages, email messages, and RSS news feeds.

By way of illustration, the following descriptions use documents and words as examples of datasets and data points, respectively. It is understood that the illustrated concepts and methodology also apply to other types of datasets and data points.

FIG. 1 is a diagram illustrating the operation of an exemplary advertisement placement system 10 that retrieves one or more advertisements for web pages 12 based on respective TSVs of advertisements 11 and the web pages 12. Advertisement placement system 10 includes a TSV generator 13 and a TSV comparator 14. TSV generator 13 is configured to generate TSV for each input dataset, such as web page 12 or advertisements 11. TSV comparator 14 compares two or more TSVs and determines the similarities therebetween. In one embodiment, TSV generator 13 and TSV comparator 14 are implemented using one or more data processors and suitable control sequences.

Advertisement placement system 10 has access to a plurality of advertisements 11 and a plurality of web pages 12. In one embodiment, the TSV associated with each of advertisements 11 is predetermined. The respective TSV may be included in each of advertisements 11 or accessible by advertisement placement system 10. In another embodiment, the TSV associated with each of advertisements 11 is dynamically generated by TSV generator 13 when system 10 is to place one or more advertisements with one or more of web pages 12. In another embodiment, the TSV associated with each of web pages 12 is predetermined. The respective TSV may be included in each of web pages 12 or accessible by advertisement placement system 10. In another embodiment, the TSV associated with a web page from web pages 12 is dynamically generated by TSV generator 13 when system 10 is to place one or more advertisements with that web page.

The TSV associated with each of advertisements 11 and the TSV associated with web page 12 are input to TSV comparator 14 to determine respective similarities between the TSV of each web page 12 and the TSV of each advertisement 11. In one embodiment the similarities between the TSVs of each web page 12 and each advertisement 11 are precomputed and stored in a database or similar storage mechanism. In another embodiment the similarities between the TSVs of each web page 12 and each advertisement 11 are dynamically computed. Advertisement placement system 10 then selects one or more advertisements 11 that are contextually relevant to web page 12 based on the respective similarities of the TSV of web page 12 and the TSVs of advertisements 11. According to one embodiment, the one or more selected advertisements are displayed with, or linked to, web page 12.

In another embodiment the advertisement placement system 10 selects one or more web pages 12 that are contextually relevant to an advertisement from advertisements 11 and the advertisement is displayed with, or linked to, the one or more selected web pages.

Construction of TSVs

Constructions of TSVs for datasets are now described. Further details of TSVs are described in U.S. Pat. No. 6,751,621, the disclosures of which are previously incorporated by reference.

Figure 2:
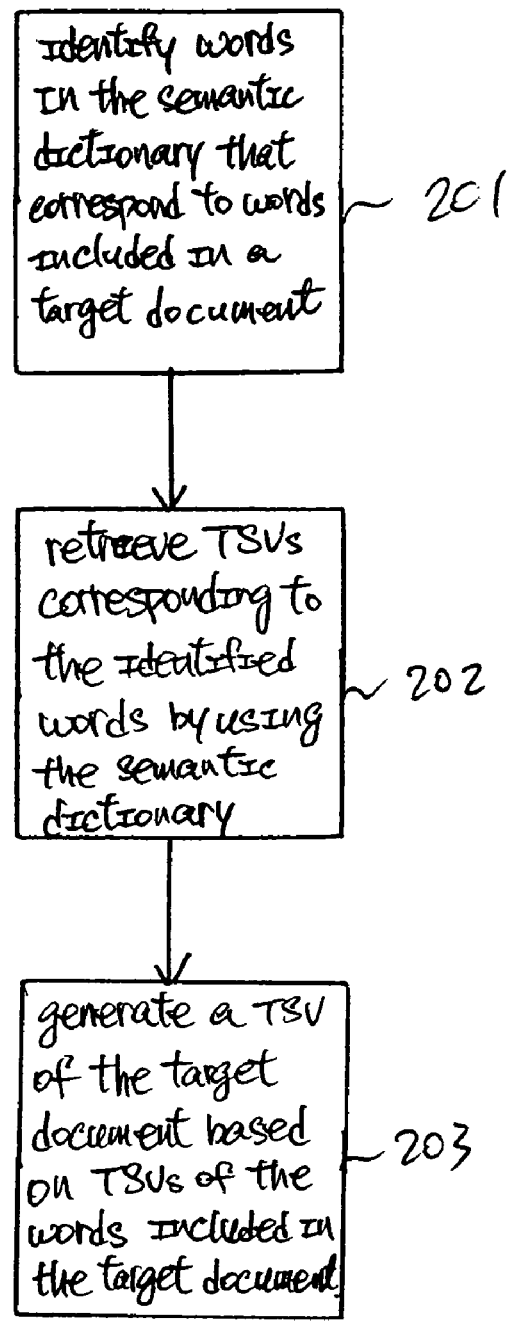
FIG. 2 is a flow chart illustrating the process for generating TSV for a dataset.

In preparation of generating TSVs for datasets, a semantic dictionary is used to find the TSVs corresponding to data points included in the datasets. The semantic dictionary includes known relationships between a plurality of predetermined data points and a plurality of predetermined categories. In other words, the semantic dictionary contains "definitions", i.e., TSVs, of the corresponding words or phrases. FIG. 2 shows an exemplary process implemented in TSV generator 13 for generating TSV for a document. The document can be an advertisement, a web page, or any other target dataset as described above. For illustration purpose, "words" are used as examples for data points included in the document. It is understood that many other types of data points may be included in the document, such as words, phrases, symbols, terms, hyperlinks, metadata information, keywords, graphics and/or any displayed or un-displayed item(s) or any combination thereof.

In step 201, TSV generator 13 identifies data points in the semantic dictionary that correspond to data points included in the document. In step 202, TSV generator 13 retrieves the respective TSV of each data point included in the document based on the definitions provided by the semantic dictionary. In step 203, TSV generator 13 generates the TSV of the document by combining the respective TSVs of the data points included in the document. For instance, the TSV of the document may be defined as a vector addition of the respective TSVs of all the data points included in the document.

The process for creating a semantic dictionary is now described. In one embodiment, the semantic dictionary is generated by properly determining which predetermined category or categories each of a plurality of predetermined datasets falls into. A sample dataset may fall in more than one predetermined categories, or the sample datasets may be restricted to associate with a single category. For example, a news report related to a patent infringement lawsuit involving a computer company may fall into categories including "intellectual property law", "business controversies", "operating systems", "economic issues", etc., depending on the content of the report and depending on the predetermined categories. Once a sample dataset is determined to be related to a certain predetermined category or categories, all the data points included in the sample dataset are associated with the same predetermined categories as described below. The same process is performed on all sample datasets. If the sample datasets consist of web pages, the data points that are used to generate the data table may include some or all of the displayable text on the web page, the metadata information associated with the web page, other web pages linked to the web page, and/or other associated information.

In one embodiment, the relationships between sample documents and categories can be determined by analyzing the Open Directory Project (ODP, www.dmoz.org), which assigned hundreds of thousands of web pages to a rich topic hierarchy by expert human editors. These sample web pages with assigned categories are called training documents for determining relationships between data points and predetermined categories. It should be clear to those skilled in the art that other online topic hierarchies, classification schemes, and ontologies can be used in similar ways to relate sample training documents to categories.

The following steps describe how the ODP hierarchy is transformed for purpose of generating a TSV semantic dictionary.

1. Download ODP web pages. The association between each web page and the ODP category to which it belongs is retained. Remove any webpages that did not download properly, and translate URLS to internal pathnames.

2. Optionally download all web pages that are referenced by any of the above ODP web pages, and create an association between each new webpage and the ODP category to which the original ODP webpage belongs. Optionally filter the web pages to keep only those new web pages that have the same categories as the original ODP web page from which it was derived. Remove any web pages that did not download properly, and translate URLs to internal pathnames.

3. Optionally remove undesired categories. Certain types of ODP categories are removed before processing. These removed categories may include empty categories (categories without corresponding documents), letterbar categories ("movie titles starting with A, B, . . . " with no useful semantic distinction), and other categories that do not contain useful information for identifying semantic content (e.g. empty categories, regional pages in undesired foreign languages) or that contain misleading or inappropriate information (e.g. adult-content pages).

4. Remove pages not appropriate for training. In one embodiment, only pages having at least a minimum amount of content are used for training. In another embodiment, a training page must have at least 1000 bytes of converted text, and a maximum of 5000 whitespace-delimited words.

5. Optionally remove any pages that are not written in English. This can be done through standard methods such as HTML meta-tags, automatic language detection, filtering on URL domain names, filtering on character ranges, or other techniques familiar to those skilled in the art.

6. Optionally remove duplicates. If a page appears in more than one ODP category, then it is ambiguously classified and may not be a good candidate for training.

7. Identify candidate TSV dimensions. Run the collapse-trim algorithm as described below to automatically flatten the ODP hierarchy and identify candidate TSV dimensions.

8. Optionally adjust the TSV dimensions. Inspect the automatically generated TSV dimensions and manually collapse, split, or remove certain dimensions based on the anticipated semantic properties of those dimensions. Types of adjustments could include, but are not limited to, the following. First, if certain words occur frequently in the original category names, those categories can be collapsed to their parent nodes (either because they are all discussing the same thing or because they are not semantically meaningful). Second, certain specific categories can be collapsed to their parents (usually because they are too specific). Third, certain groups of categories separated in the ODP hierarchy can be merged together (for example, "Arts/Magazines and E-Zines/E-Zines" can be merged with "Arts/Online Writing/E-Zines").

9. Create TSV training files. For each potential training page, associate that page with the TSV dimension into which the page's category was collapsed. Then select the pages from each TSV dimension that will be used to train that dimension, being careful not to overtrain or undersample. In one embodiment, we randomly select 300 pages that have at least 1000 bytes of converted text (if there are fewer than 300 appropriate pages, we select them all). We then remove any pages longer than 5000 whitespace-delimited words, and we keep a maximum of 200,000 whitespace-delimited words for the entire dimension, starting with the smallest pages and stopping when the cumulative word count reaches 200,000.

10. Optionally relabel dimensions. Each dimension starts off with the same label as the ontology path of the ODP category from which it was derived. In one embodiment some labels are manually adjusted to shorten them, make them more readable, and ensure that they reflect the different subcategories that were combined or removed. For example, an original label of "Top/Shopping/Vehicles/Motorcycles/Parts_and_Accessories/Harley_Davidson" might be rewritten "Harley Davidson, Parts and Accessories".

In one embodiment, the collapse-trim algorithm walks bottom-up through the ODP hierarchy looking at the number of pages available directly in each category node. If there are at least 100 pages stored at that node, then we keep that node as a TSV dimension. Otherwise we collapse it into the parent node.

Figure 3:
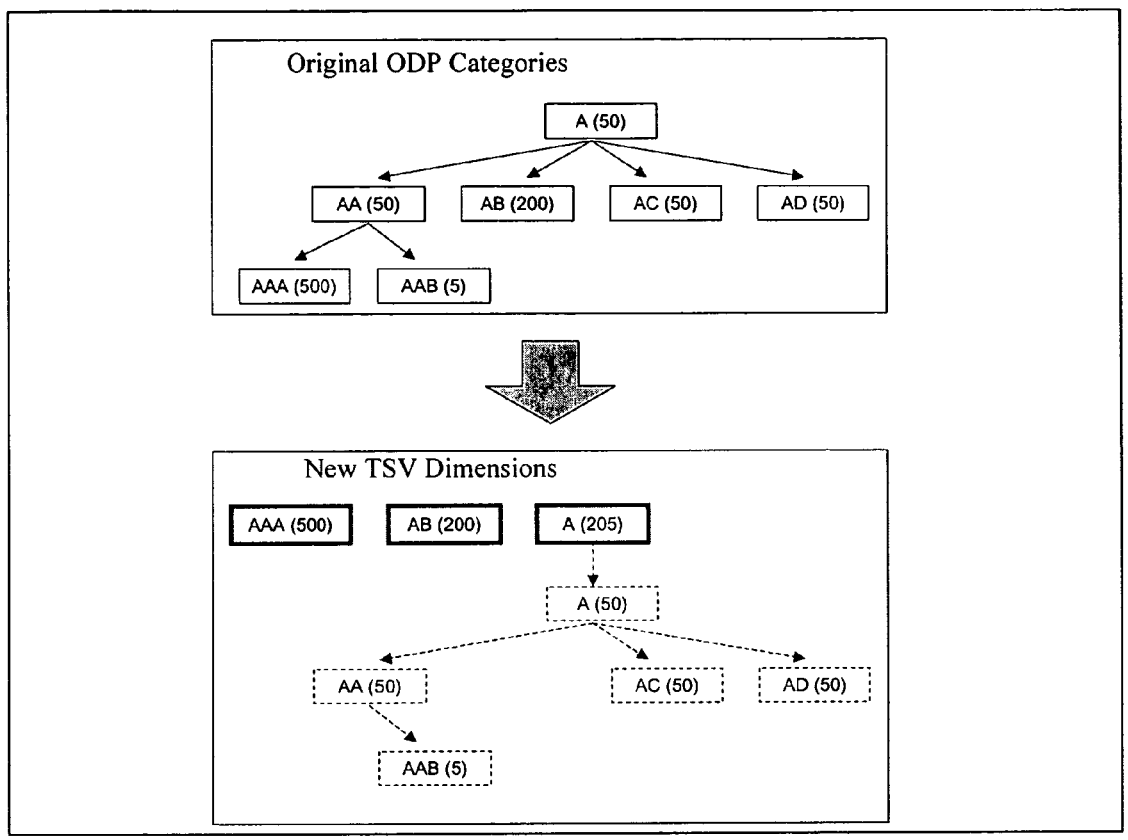
FIG. 3 illustrates the operation of an exemplary collapse-trim algorithm.

FIG. 3 shows the operation of an exemplary collapse-trim algorithm. A preset threshold is provided to determine whether a specific category has sufficient assigned documents. If a specific category has more assigned documents than the preset threshold, it is considered that the specific category is qualified as a dimension in the semantic dictionary. Otherwise, the category needs further manipulations, such as cancellation of the category, combination with other categories, etc. In this example, the preset threshold is set as 100 documents. As shown in FIG. 3, categories AAA and AB have sufficient number of assigned documents, so they become dimensions for use in the semantic dictionary. Category AAB does not have sufficient assigned documents and hence is collapsed into AA. Then AA, AC, and AC are further collapsed into A. Accordingly, after this process, the dimensions to be used in the semantic dictionary are AAA and A.

In another embodiment, the collapse-trim algorithm first marks category nodes for removal based on whether there are at least 100 pages stored directly in the node. Once all nodes have been identified to be either removed or kept, the algorithm checks the number of links identified to be removed relative to the total number of links (number of links to remove divided by sum of number of links to remove plus the number of links to keep). If the number is greater then a specified percentage (e.g. 20%), then the child nodes should be subsumed into the parent node. If the number is less than the specified percentage, then all the identified child nodes are removed.

After the assignment of sample datasets to predetermined categories (dimensions) is performed, a data table is created storing information that is indicative of a relationship between data points included in one or more sample datasets and predetermined categories based on the assignment result. Each entry in the data table establishes a relationship between a data point and one of the predetermined categories. For example, an entry in the data table can correspond to the number of sample datasets, within a category, that contain a particular data point. The data points correspond to the contents of the sample datasets, while the predetermined categories correspond to dimensions of the semantic space. The data table may be used to generate a semantic dictionary that includes "definitions" of each word, phrase, or other data point within a specific semantic space formed by the predetermined categories, for use in constructing trainable semantic vectors.

Figure 4:
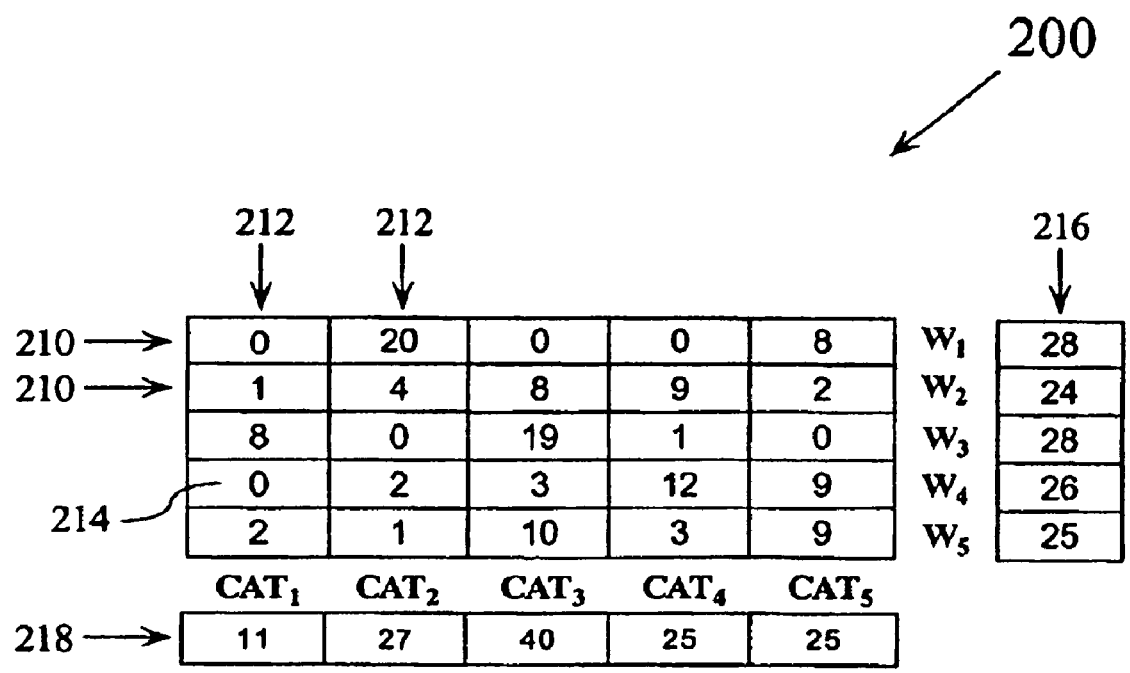
FIG. 4 is a table showing relationships between words and categories.

FIG. 4 shows an exemplary data table for constructing a semantic dictionary. For simplicity and ease of understanding, in FIG. 4, the number of words and the number of predetermined categories has been reduced to five. In practice, there are often hundreds of thousands of terms, and thousands of predetermined categories.

As illustrated in FIG. 4, table 200 contains rows 210 that correspond to the predetermined categories $Cat_1$, $Cat_2$, $Cat_3$, $Cat_4$, and $Cat_5$, and columns 212 representative words $W_1$, $W_2$, $W_3$, $W_4$, and $W_5$. Each entry 214 within table 200 corresponds to a number of documents that have a particular word, such as one or more of words $W_1$, $W_2$, $W_3$, $W_4$, and $W_5$, occurring in the corresponding category.

Summation of the total number of columns 212 across each row 210 provides the total number of documents that contain the word represented by the row 210. These values are represented at column 216. Referring to FIG. 4, word $W_1$ appears twenty times in category $Cat_2$ and eight times in category $Cat_5$. Word $W_1$ does not appear in categories $Cat_1$, $Cat_3$, and $Cat_4$.

Referring to column 216, word $W_1$ appears a total of 28 times across all categories. In other words, twenty-eight of the documents classified contain word $W_1$. Examination of an exemplary column 212, such as $Cat_1$, reveals that word $W_2$ appears once in category $Cat_1$, word $W_3$ appears eight times in category $Cat_1$, and or $W_5$ appears twice in category $Cat_1$. Word $W_4$ does not appear at all in category $Cat_1$. As previously stated word $W_1$ does not appear in category 1. Referring to row 218, the entry corresponding to category $Cat_1$ indicates that there are eleven documents classified in category $Cat_1$.

According to one embodiment, after the data table is constructed, the significance of each entry in the data table is determined. The significance of the entries can, under certain situations, be considered the relative strength with which a word occurs in a particular category, or its relevance to a particular category. Such a relationship, however, should not be considered limiting. The significance of each entry is only restricted to the actual dataset and categories (i.e. features, that are considered significant for representing and describing the category). According to one embodiment of the disclosure, the significance of each word is determined based on the statistical behavior of the words across all categories. This can be accomplished by first calculating the percentage of data points occurring in each category according to the following formula:

$$u=Prob(entry|category)=(entry_n, category_m)/category_{m\_total}$$

Next, the probability distribution of a data point's occurrence across all categories is calculated according to the following formula:

$$v=Prob(category|entry)=(entry, category_m)/entry_{n\_total}$$

Both u and v represent the strength with which a word is associated with a particular category. For example, if a word occurs in only a small number of datasets from a category but doesn't appear in any other categories, it would have a high v value and a low u value for that category. If the entry appears in most datasets from a category but also appears in several other categories, then it would have a high u value and a low v value for that category.

Depending on the quantity and type of information being represented, additional data manipulation can be performed to improve the determined significance of each word. For example, the value of u for each category can be normalized (i.e., divided) by the sum of all values for a data point, thus allowing an interpretation as a probability distribution.

A weighted average of u and v can also be used to determine the significance of data points, according to the following formula:

$$\alpha(v)+(1-\alpha)(u)$$

The variable $\alpha$ is a weighting factor that can be determined based on the information being represented and analyzed. According to one embodiment of the present disclosure, the weighting factor has a value of about 0.75. Other values can be selected depending on various factors such as the type and quantity of information, or the level of detail necessary to represent the information. Through empirical evidence gathered from experimentation, the inventors have determined that the weighted average of the u and v vectors can produce superior results than that achievable using only u, only v, or using an unweighted combination of u and v.

FIG. 5 illustrates the operation of the above-described manipulating process based on the data from FIG. 4. In FIG. 5, a table 230 stores the values that indicate the relative strength of each word with respect to the categories. Specifically, the percentage of data points occurring in each category (i.e., u) is presented in the form of a vector for each word. The value for each entry in the u vector is calculated according to the following formula:

$$u=Prob(word|category)=(words, category_m)/category_{m\_total}$$

Table 230 also presents the probability distribution of a data point's occurrence across all categories (i.e., v) in the form of a vector for each word. The value for each entry in the v vector is calculated according to the following formula:

$$v=Prob(category|entry)=(words, category_m)/word_{n\_total}$$

Turning now to FIG. 6, a table 250 is shown for illustrating the semantic representation or "definition" of the words from FIG. 4. Table 250 is a combination of five TSVs that correspond to the semantic representation of each word across the semantic space. For example, the first row corresponds to the TSV of word $W_1$. Each TSV has dimensions that correspond to the predetermined categories. Additionally, the TSVs for words $W_1$, $W_2$, $W_3$, $W_4$, and $W_5$ are calculated according to an embodiment of the disclosure wherein the entries are scaled to optimize the significance of the word with respect to that particular category. More particularly, the following formula is used to calculate the values.

$$\alpha(v)+(1-\alpha)(u)$$

The entries for each TSV are calculated based on the actual values stored in table 230. Accordingly, the TSVs shown in table 250 correspond to the "definition" of the exemplary words $W_1$, $W_2$, $W_3$, $W_4$, and $W_5$ represented in FIG. 4 relative to each predetermined categories or vector dimension, which collectively compose a semantic dictionary for the semantic space formed by the predetermined categories.

It is sometimes desirable to place an advertisement on documents that are local to the market of the product being advertised. This may be achieved by embedding geographic information (such as zip code, city/state names) in the advertisement or by accessing and associating the user's IP address with a geographic region. However, not all documents contain the geographic information in the appropriate form, and not all users have IP addresses that correspond to their local region. In this case, additional categories related to geographic regions can be included in the predetermined categories during the formation of the semantic dictionary as described above. Each geographic region becomes a dimension in the semantic space, and sample datasets tagged with geographic information are used to create the semantic dictionary. That semantic dictionary can then be used to produce TSVs for datasets and advertisements that reflect the strength with which those datasets and advertisements are associated with different geographic regions.

TSV is not restricted to just one language. As long as appropriate sample datasets are available, it is possible to build a semantic dictionary for different languages. For instance, English sample datasets from the Open Directory Project can be replaced with suitable sample datasets in another language in generating the semantic dictionary. There can be a separate semantic dictionary for each language. Alternately, the data points for all languages can reside in a single common semantic dictionary. Different languages may share the same predetermined categories or semantic dimensions, or may have completely different predetermined categories or semantic dimensions, depending on whether they share the same semantic dictionary and whether it is desired to compare semantic vectors across languages.

After the semantic dictionary is created, the semantic dictionary can be accessed by TSV generator 13 to find corresponding TSVs for data points included in the target document. In one embodiment, the TSVs of the data points included in the target document are combined to generate the TSV of the target document. The manner in which the TSVs are combined depends upon the specific implementations. For example, the TSVs may be combined using a vector addition operation. In this case, TSV for a document can be represented as follows:

$$TSV(document) = TSV(W1) + TSV(W2) + TSV(W3) \ldots + TSV(WN)$$

where W1, W2, W3, ... WN are words included in the document.

It should be appreciated, however, that the TSVs can also be combined using different operations such as, for example, taking a vector average of all the TSVs, or incorporating other factors such as scaling each dimension by the number of data points in the dataset that contribute to that dimension.

As discussed earlier relative to FIG. 1, advertisement placement system 10 selects one or more advertisements that are contextually related to web page 12 based on the respective similarities between the TSV of web page 12 and the advertisement TSVs.

TSVs for advertisements 11 and web page 12 can be predetermined or determined dynamically using TSV generator 13 implementing a TSV construction process, such as those described earlier. In one embodiment, the advertisements or datasets include information related to their respective TSVs.

The generation of TSVs for advertisements and datasets may utilize many types information including data points in the advertisements and datasets, information retrieved based on data points included in the advertisements and datasets, and additional information assigned to the advertisements and datasets. For instance, the generation of TSVs for advertisements may be performed based on information including, but not limited to, words displayed in the advertisements, a set of keywords associated with each advertisement, the title of the advertisement, a brief description of the advertisement, marketing literature associated with the advertisement that describes the item being advertised or the audience to which it is being sold, and information from web sites that may be referenced by the advertisement. The generation of TSVs for web pages may be performed based on information including, but not limited to, some or all of the actual text that appears on the web page, meta-text fields associated with the web page such as title, keywords, and description, text from other web pages linked to or linked by the web page, etc.

For faster operation speed, the TSVs for advertisements can be generated off-line and updated as advertisements are modified, added, or removed. But TSVs can also optionally be generated at the time of advertisement placement. Similarly, TSVs for web pages or other datasets can be generated either off-line or dynamically.

Comparison of TSVs Between Advertisements and Datasets

Referring to FIG. 1, advertisement placement system 10 utilizes a TSV comparator 14 to determine the respective similarities between web page 12 and advertisements 11. In one embodiment, the relevance of one item to another (or one descriptor to another) can be determined based on the distance between the semantic vectors, such as determining N-dimensional Euclidean distance between the TSVs, where N is the number of dimensions of the semantic space or the predetermined categories. The shorter the distance between TSV of web page 12 and TSV of an advertisement, the more similar between web page 12 and the advertisement. Other comparison methods, such as cosine measure, Hamming distance, Minkowski distance or Mahalanobis distance can also be used. Various optimizations can be performed to improve the comparison time including reducing the dimensionality of the TSVs prior to comparison and applying filters to eliminate certain advertisements prior to or subsequent to comparison.

Selecting Relevant Advertisements

After TSV comparator 14 determines respective similarities between TSV of web page 12 and TSVs of advertisements 11, advertisement placement system 10 selects one or more advertisements to display with web page 12 based on the comparison result. Optionally, a threshold can be applied such that advertisements are only included if they achieve a minimum relevance level. Optionally, several thresholds can be applied to group advertisements by quality such as highly relevant, somewhat relevant, and not relevant to the web page. Optionally, additional information in addition to TSVs or semantic representations can be used for selecting one or more advertisements. The information can include bid price for the advertisements, presence or absence of specific words, and past history of advertisement placement with the current advertisement or the current document.

Variations

As described earlier, information used in selecting relevant advertisements is not limited to contents of the dataset to be matched with advertisements. A variation of the system generates a TSV associated with one or more users based on information related to the user or users, such as web pages that were previously viewed, previous search requests, user preferences, personal information, and so on. The data points from these various sources can be looked up in the semantic dictionary to form a TSV representative of the user's interests, review habits or information needs. The TSV associated with the individual user can be combined with the TSV of a dataset being manipulated by the user to determine whether an advertisement is relevant for the dataset and the user. According to another variation, an advertisement is retrieved based on a comparison between the TSV associated with the user and TSVs of advertisements, without calculating TSV associated with the web page or document being manipulated by the user.

According to still another variation, TSV is generated for sets of users that share common interests or properties, such as user communities. Another extension of this approach uses an aging factor to reduce the importance of old topics that appear to be no longer in the user's (or set of users) current interests to ensure that the presented advertisements have timely importance. Another variation associates multiple TSVs with a user (or set of users) to track multiple interests over time. Still another variation uses techniques such as clustering of multiple TSVs to provide greater focus on advertisement relevance. Approaches to perform clustering of TSVs are described in U.S. Pat. No. 6,751,621, which is previously incorporated by reference.

There may be occasions where a TSV constructed for a dataset or an advertisement may not be completely satisfactory to a user. For example, a TSV for an advertisement may have weights for certain categories that the advertiser believes are too weak for the product. These weights related to the categories are calculated based on the data points contained in the dataset or the advertisement. For example, an advertisement for a cell phone hands-free headset may have a TSV that looks like the following:

| Cell Phone Accessories | 0.5917 |
| Telecom Equipment Suppliers | 0.4919 |
| Computer Speech Technology | 0.3018 |
| Consumer Electronics | 0.2325 |
| Wireless Equipment | 0.1854 |
| Science and Technology Issues | 0.1723 |
| Assistive Technology | 0.1449 |

The advertiser may feel that for most effective marketing the product should have a stronger emphasis on "Assistive Technology." Various variations to the systems and methods disclosed herein allow the user to artificially manipulate semantic vectors to achieve desired effects.

According to one variation, instead of generating a semantic vector directly for a dataset or advertisement, the semantic vector can be generated based on "surrogate" text that is known or assumed to be substantially similar to the dataset or advertisement, and does not need to calculate TSVs for data points included in the dataset or advertisement. In another embodiment, artificial information, which is not directly available in the advertisements or datasets, is added in generating TSVs for advertisements and datasets. In the example above, the advertiser could supplement the advertisement with additional data points (keywords, phrases, or other data) to emphasize the desired category. A new TSV generated from the supplemented advertisement would then have the desired emphasis.

According to another embodiment, the TSV of an advertisement or a dataset may be manipulated directly to artificially adjust its relevance to selected categories or semantic dimensions. In the example above, the advertiser might directly change the weight of "Assistive Technology" to 0.3142; once the vector is renormalized it would form a semantic vector with substantially stronger emphasis on the desired category that could be directly compared to other TSVs. According to still another variation, semantic representations of advertisements and/or datasets are generated by utilizing a vector assignment process, in which a semantic vector is assigned to each advertisement or dataset by selectively assigning values to entries relative to the predetermined categories in the semantic dictionary, without calculating TSV for each data point included in the advertisement or dataset. In the example above, the advertiser could manually create a new vector with whatever dimensions and weights are desired. After normalization, the assigned vector forms a semantic vector that could be compared directly to other TSVs. This assignment process does not need to calculate TSVs for data points included in the advertisements. However, since the assigned vector uses the same vector dimensions as TSV of a target dataset, a similarity between the assigned vector of the advertisement and the TSV of the target dataset can be performed, after suitable vector normalization, to determine the contextual relevance therebetween.

According to another embodiment, an exemplary system calculates TSVs for various sections of a dataset, such as a web page or displayed document, and automatically links to each section one or more descriptions from a set of background articles, such as encyclopedic articles from Wikipedia (http://www.wikipedia.org), based on a similarity between the respective trainable semantic vectors of the sections and the background articles.

According to yet another embodiment, an exemplary system relates specific products, such as books, to dynamic user content, such as e-mail messages or RSS feeds, based on a similarity between the respective trainable semantic vectors of the respective product descriptions and user content.

It is understood to people skilled in the art that the methods and systems disclosed herein are applicable to various purposes, such as associating one or more advertisements to one or more web pages or documents, or vice versa; retrieving related documents based on a user's search queries; finding background information for different portions of a dataset, and the like. It is also understood that a dataset as used herein may include only a single type of dataset, such as web page(s) or document(s), or a collection of different types of datasets, such as a combination of e-mails and web pages, documents and broadcasting data.

Hardware Overview

Figure 7:
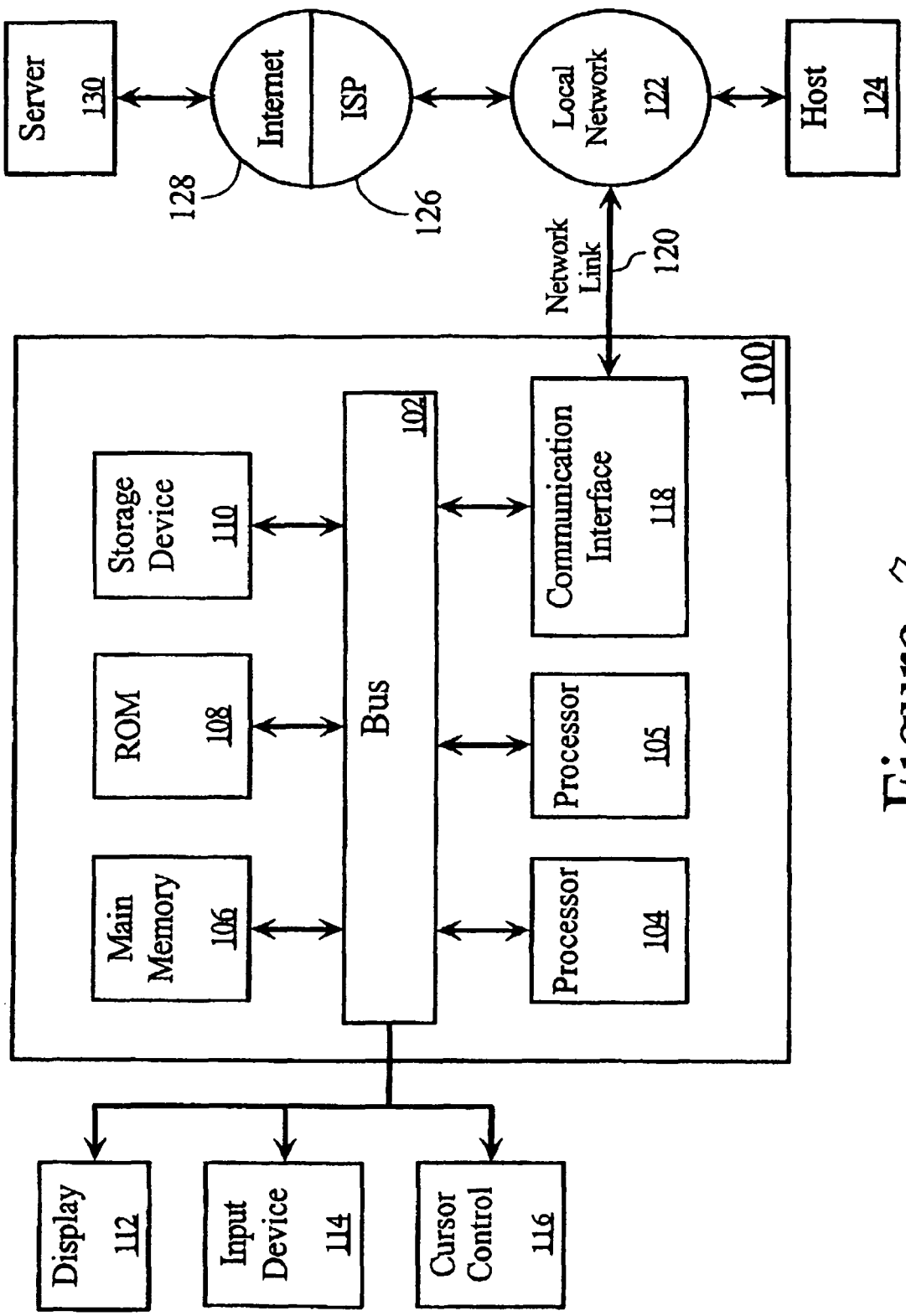
FIG. 7 is a block diagram of an exemplary computer system upon which an exemplary advertisement placement system may be implemented.

FIG. 7 is a block diagram that illustrates a computer system 100 upon which an exemplary advertisement placement system of this disclosure may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

According to one embodiment of the disclosure, construction of TSVs and semantic operations are is provided by computer system 100 in response to processor 104 executing one or more sequences of one or more instructions contained in main memory 106 or storage device 110, or received from the network link 120. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the disclosure. Thus, embodiments of the disclosure are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 10 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the disclosure, one such downloaded application provides for constructing TSVs and performing various semantic operations as described herein. The received code may be executed by processor 104 as it is received, and/or stored in storage device 110, or other non-volatile storage for later execution. In this manner, computer system 100 may obtain application code in the form of a carrier wave.

In the previous descriptions, numerous specific details are set forth, such as specific materials, structures, processes, etc., in order to provide a thorough understanding of the present disclosure. However, as one having ordinary skill in the art would recognize, the present disclosure can be practiced without resorting to the details specifically set forth. In other instances, well known processing structures have not been described in detail in order not to unnecessarily obscure the present disclosure.

Only the illustrative embodiments of the disclosure and examples of their versatility are shown and described in the present disclosure. It is to be understood that the disclosure is capable of use in various other combinations and environments and is capable of changes or modifications within the scope of the inventive concept as expressed herein.

What is claimed is:

1. A machine-readable non-transitory medium having instructions stored thereon, where the instructions, when read by the machine, cause the machine to perform the steps of:
   accessing a semantic representation associated with a first dataset and a semantic representation associated with a second dataset, wherein at least one of the semantic representation associated with the first dataset and the semantic representation associated with the second dataset is a trainable semantic vector generated based on at least one data point included in a respective dataset and known relationships between predetermined data points and predetermined categories to which the predetermined data points may relate;
   determining a similarity between the semantic representation associated with the first dataset and the semantic representation associated with the second dataset; and
   selectively relating the first dataset to the second dataset based on a result of the determining step;
   wherein each attribute in a trainable semantic vector indicates how likely a dataset represented by the trainable semantic vector belongs to one of the predetermined categories, and
   the trainable semantic vector has a dimension equal to the number of the predetermined categories.

2. The machine-readable medium of claim 1, wherein one of the first dataset and the second dataset is an advertisement, and the other one of the first dataset and the second dataset is one or more documents, web pages, e-mails, RSS news feeds, data streams, broadcast data or information related to a user; or a portion or a combination of one or more documents, web pages, e-mails, RSS news feeds, data streams, broadcast data or information related to a user.

3. The machine-readable medium of claim 1, wherein one of the first dataset and the second dataset is a portion of a document, a web page, an e-mail, RSS news feeds, a data stream, broadcast data or information related to a user, and the other one of the first dataset and the second dataset is at least one background data source.

4. The machine-readable medium of claim 1 further comprising the step of selectively conveying the first dataset along with the second dataset based on a result of the selectively relating step.

5. The machine-readable medium of claim 4, wherein the first dataset is conveyed by display or a link accessible from the second dataset.

6. The machine-readable medium of claim 1, wherein the at least one data point includes at least one of a word, a phrase, a character string, a pre-assigned keyword, a sub-dataset, meta information and information retrieved based on a link included in the respective dataset.

7. The machine-readable medium of claim 1, wherein the trainable semantic vector is pre-calculated and included in the respective dataset.

8. The machine-readable medium of claim 1, wherein the trainable semantic vector is dynamically generated.

9. The machine-readable medium of claim 1, wherein the predetermined data points include at least one language.

10. The machine-readable medium of claim 1, wherein the trainable semantic vector associated with the respective dataset is generated further based on information related to at least one user or at least one dataset linked to said dataset.

11. The machine-readable medium of claim 1, wherein the information related to the at least one user includes at least one of documents previously viewed, previous search requests, user preferences and personal information.

12. The machine-readable medium of claim 1, wherein the relating step comprises the steps of:
   accessing a predetermined threshold; and
   relating the first dataset to the second dataset only when the similarity between the semantic representation associated with the first dataset and the semantic representation of the second dataset exceeds the predetermined threshold.

13. The machine-readable medium of claim 1, wherein the trainable semantic vector is reduced by selectively setting a value of at least one selected vector entry to zero.

14. The machine-readable medium of claim 13, wherein the at least one selected vector entry has a value less than a predetermined threshold.

15. The machine-readable medium of claim 13, wherein the at least one selected vector entry has a value less than the Nth largest value and where N is a predetermined constant.

16. The machine-readable medium of claim 1, wherein the predetermined categories include at least one geographic category.

17. The machine-readable medium of claim 1, wherein the semantic representation associated with one of the first dataset and the second dataset includes information from a pre-assigned vector derived based on preferred categories selected from the predetermined categories.

18. The machine-readable medium of claim 1 further comprising the step of increasing a weight of at least one entry in the semantic trainable vector corresponding to at least one of the predetermined categories.

19. The machine-readable medium of claim 1, wherein the trainable semantic vector of the respective dataset is constructed by the steps of:
   identifying a relationship between each of the at least one data point and the predetermined categories based on the known relationships between the predetermined data points and the predetermined categories;
   determining the significance of each of the at least one data point with respect to the predetermined categories according to a result of the identifying step;
   constructing a trainable semantic vector for each of the at least one data point based on the determined significance of each of the at least one data point with respect to the predetermined categories; and
   forming the semantic vector of the respective dataset based on the trainable semantic vector for each of the at least one data point.

20. An advertisement placement system for relating one of a plurality of advertisements to a dataset, the system comprising:
   a data processor configured to process data; and
   a data storage system configured to store instructions which, upon execution by the data processor, control the data processor to perform the steps of:
   accessing a semantic representation associated with a first dataset and a semantic representation associated with a second dataset, wherein at least one of the semantic representation associated with the first dataset and the semantic representation associated with the second dataset is a trainable semantic vector generated based on at least one data point included in a respective dataset and known relationships between predetermined data points and predetermined categories to which the predetermined data points may relate;
   determining a similarity between the semantic representation associated with the first dataset and the semantic representation associated with the second dataset; and
   selectively relating the first dataset to the second dataset based on a result of the determining step;
   wherein each attribute in a trainable semantic vector indicates how likely a dataset represented by the trainable semantic vector belongs to one of the predetermined categories, and
   the trainable semantic vector has a dimension equal to the number of the predetermined categories.

21. The system of claim 20, wherein the trainable semantic vector of the respective dataset is constructed by the steps of:
   identifying a relationship between each of the at least one data point and the predetermined categories based on the known relationships between the predetermined data points and the predetermined categories;
   determining the significance of each of the at least one data point with respect to the predetermined categories according to a result of the identifying step;
   constructing a trainable semantic vector for each of the at least one data point based on the determined significance of each of the at least one data point with respect to the predetermined categories; and
   forming the semantic vector of the respective dataset based on the trainable semantic vector for each of the at least one data point.

22. A method implemented on a computer having a storage, a processor, and a communication platform connected to a network for ascertaining the relatedness between a first dataset to a second dataset, the method comprising the steps of:

accessing, from the storage of the computer, a first semantic representation associated with the first dataset and a second semantic representation associated with the second dataset;

obtaining, by the processor, a similarity between the first dataset and the second dataset based on the first and second semantic representations, where the similarity is assessed in terms of how each of the first and second datasets relates to a plurality of predetermined categories; and determining, by the processor, how the first dataset is related to the second dataset based on the similarity obtained, wherein at least one of the semantic representations associated with the first and second datasets is a trainable semantic vector, each attribute in the trainable semantic vector indicates how likely a dataset represented by the trainable semantic vector belongs to one of a plurality of predetermined categories, and the trainable semantic vector has a dimension equal to the number of the predetermined categories.

* * * * *